United States Patent [19]

Rühl et al.

[11] Patent Number: 4,532,261
[45] Date of Patent: * Jul. 30, 1985

[54] FILLER SYSTEM FOR A NON-FLAMMABLE RIGID FOAM AND USE OF THE RIGID FOAM AS A BUILDING MATERIAL

[75] Inventors: Erich Rühl, Saalburgstrasse 65, 6382 Friedrichsdorf; Johann Thenner, Pohlheim, both of Fed. Rep. of Germany

[73] Assignee: Erich Rühl, Fed. Rep. of Germany

[*] Notice: The portion of the term of this patent subsequent to Jun. 4, 2002 has been disclaimed.

[21] Appl. No.: 666,802

[22] Filed: Oct. 31, 1984

Related U.S. Application Data

[60] Continuation-in-part of Ser. No. 636,233, Jul. 31, 1984, which is a division of Ser. No. 555,403, Nov. 28, 1983, Pat. No. 4,463,106.

[30] Foreign Application Priority Data

Dec. 3, 1982 [DE] Fed. Rep. of Germany ....... 3244779
Mar. 1, 1984 [DE] Fed. Rep. of Germany ....... 3407512

[51] Int. Cl.$^3$ ............................................... C08J 9/14
[52] U.S. Cl. ..................................... 521/103; 521/85; 521/92; 521/106; 521/121; 521/124; 521/136; 521/181; 521/907
[58] Field of Search ................... 521/103, 85, 92, 106, 521/121, 124, 136, 181, 907

[56] References Cited

U.S. PATENT DOCUMENTS 4,353,994 10/1982 Smith ................................. 521/181
4,419,460 12/1983 Ho ..................................... 521/181
4,463,106 7/1984 Rühl et al. .......................... 521/103

*Primary Examiner*—Morton Foelak
*Attorney, Agent, or Firm*—Keil & Weinkauf

[57] ABSTRACT

There is disclosed a non-flammable rigid foam on the basis of phenolic resin and furane resin, containing aluminum hydroxide and further components as a filler system. The weight ratio of resin substance:filler substance is at least 1:2.5 and up to 1:3.2 and the bulk density is from 50 kg/m$^3$ to 450 kg/m$^3$. The resin compound is the reaction product obtained by the reaction with one another of 50–62 weight parts resolic resin
0–15 weight parts furanic resin
25–40 weight parts furfuryl alcohol
0.5–1.5 weight parts foam stabilizer including 14–17 parts by weight per 100 parts by weight of resin component + filler substance of a curing agent mixture composed of 40–50 weight parts phosphoric acid
12–17 weight parts boron hydrofluoric acid
6–7 weight parts p-toluene sulfonic acid or p-phenol sulfonic acid and
32–35 weight parts water, wherein the filler system is composed of:
40–50 weight parts aluminum hydroxide;
10–20 weight parts boric acid;
7–25 weight parts cryolite;
1–3 weight parts copper-II oxide; and
2–5 weight parts sodium tetraborate or a filler component selected from the group consisting of zinc borate, magnesium hydroxide, zinc hydroxide and mixtures thereof, the ratio of borate or said filler component:boric acid being 1:5.

17 Claims, No Drawings

FILLER SYSTEM FOR A NON-FLAMMABLE RIGID FOAM AND USE OF THE RIGID FOAM AS A BUILDING MATERIAL

This application is a continuation-in-part of copending application Ser. No. 636,233 filed July 31, 1984, which, in turn, was a division of application Ser. No. 555,403 filed Nov. 28, 1983, now U.S. Pat. No. 4,463,106.

In U.S. Pat. No. 4,463,106, there is described a non-flammable rigid foam on the basis of phenolic resins and furane resins comprising a filler system including aluminum hydroxide and further components. The present invention is directed to a further improved filler system obtained by combining aluminum hydroxide with further compounds. The rigid foam has a bulk density of 50 kg/m$^3$ to 450 kg/m$^3$ which complies with the requirements according to DIN 4102 and DIN 53436 so that it can be used as a non-flammable building material.

Phenolic resin foam materials are manufactured in nominal densities of 40 to 100 kg/m$^3$. Because of their comparatively high closed cell contents of about 75% they are used in buildings mainly as a thermal insulator. Such duroplastics foam materials, because of their 3-dimensional cross linkage, are subjected in the event of fire primarily to carbonization. The resulting carbon layer protects the underlying foam against further attack by flame and in addition this carbon layer in the event of pyrolysis gases catching fire, brings about an extinguishing of the flame.

The combustion performance is a process which takes place at the surface of the foam material, i.e., the extent of burning is determined by the surface area available, which in the case of foam materials having bulk densities as low as 40 kg/m$^3$, may be very large. As a consequence thereof the combustible material anywhere within the range of flames and radiation is almost totally pyrolyzed. This is further promoted by a certain degree of closed cell characteristics and the low thermal conductivity resulting therefrom which creates a heat build-up. This lends additional support to the pyrolysis and the combustion process.

In the case of phenolic resin foams the thermal stability may be up to about 130° C. and for short durations up to 250° C. The emission of volatile gases commences at 270° C. and these may briefly burn when exposed to an open flame. From 400° C. only glimmering is to be observed which is caused by oxidation processes at the surface of the solid carbon resins. The addition of boric acid to phenolic resins acts as a flame protector. However, since boric acid is a slow acting curing agent, the shelf life of the phenolic resin is limited to 24 hours, wherefore the addition of boric acid as a flame protecting agent to phenolic resin mixtures results in processing difficulties, more particularly in that the addition is possible only immediately prior to processing.

J. Troitsch in Kunststoffe 69/9, pages 558–561 (1979) points out that only few inorganic compounds exist which are suitable for use as a flame protecting agent in plastics. Aluminum hydroxide and boron-containing compounds are employed for this purpose since they can be incorporated into plastics. J. Greber and D. J. Braun describe in Plastverarbeiter 33/1, pages 43–46 (1982) that aluminum hydroxide can be used as flame retarding filler for unsaturated polyester resins. In order to produce building components which when subjected to fire testing according to DIN 4102 are classified in Class B1 (flame resistant), filler contents of more than 55 weight % are needed. However, the need for such high filler contents results in substantial processing problems which can be overcome only partly by the use of special aluminum hydroxides. Since the fire performance of materials depends not only on their contents of flame protecting agents in the mixture, but also on the design configuration of the testing bodies, the provision of unsaturated polyester resins with aluminum hydroxide as a flame protection agent creates more problems than fire-proofing with conventional halogen-antimony systems.

A non-flammable material which does not evolve toxic fumes is known from DE-OS No. 28 25 295 on the basis of phenolic resins and furfuryl alcohol. The material comprises 62–66 weight % aluminum oxide or aluminum hydroxide as an inorganic filler and may in addition contain up to 3 weight % finely divided silicic acid and other components. A closed or rigid foam having a bulk density of 500 g/l can be produced by the addition of a bloating agent. However, the material suffers from a number of disadvantages. Because of the use of organic sulfo acids as a single component in the curing agent system, the cured finished product is hygroscopic and is moreover, as a result thereof, subject to a prolonged final curing period. It was found that due to the high density, the final curing period for attainment of ultimate strength amounted to several weeks. Moreover, this material is highly corrosive with respect to metallic surfaces. Due to the high viscosity of the reaction mixture a substantial non-homogeneous foam mixture results from foaming. Moreover, when exposed to fire, the content of sulfur dioxide in the smoke or pyrolysis gas is still very high.

The rigid foam described in the above-mentioned U.S. Pat. No. 4,463,106 has a bulk density below 500 kg/m$^3$ which in fire conditions releases no toxic or corrosive gases, the mechanical and insulating properties of which permit its use in the building field and which complies with the requirements of class A 2 (non-flammable) when subjected to fire testing according to DIN 102.

It is the object of the present invention to further improve the properties of said rigid foam by way of an improved filler system.

According to the invention there is provided a non-flammable rigid foam on the basis of phenolic resin and furane resin, containing aluminum hydroxide and further components as a filler system, the resin component being formed by reaction of phenolic resin, furfuryl alcohol and a sulfo acid as curing agent, wherein the weight ratio of resin substance: filler substance is at least 1:2.5 and up to 1:3.2 and the bulk density is from 50 kg/m$^3$ to 450 kg/m$^3$ and the resin compound is the reaction product obtained by the reaction with one another of 50–62 weight parts resolic resin
0–15 weight parts furanic resin
25–40 weight parts furfuryl alcohol
0.5–1.5 weight parts foam stabilizer
including 14–17 parts by weight per 100 parts by weight of resin component + filler substance of a curing agent mixture composed of
40–50 weight parts phosphoric acid
12–17 weight parts boron hydrofluoric acid
6–7 weight parts p-toluene sulfonic acid or p-phenol sulfonic acid and
32–35 weight parts water The filler system according to the invention consists of
40–55 weight parts aluminum hydroxide
10–20 weight parts boric acid
2–5 weight parts sodium tetraborate
7–25 weight parts cryolite
1–3 weight parts copper II-oxide wherein the ratio of borate:boric acid is 1:5.

The rigid foam according to the invention consists of a filler mixture being a filler system of aluminum hydroxide and further compounds, and of a resin component wherein the weight ratio of resin material: filler material is at least 1:2.5 and the bulk density is from 50 kg/m$^3$ to 450 kg/m$^3$.

The resin component is obtained by reacting 50–62 weight parts resolic acids, 0–15 weight parts furane resin, 25–40 weight parts furfuryl alcohol, 0.5–5 weight parts foam stabilizer, jointly with the filler, with 14–17 weight parts per 100 weight parts of resin component plus filler of a curing agent mixture comprising 40–50 weight parts phosphoric acid, 12–17 weight parts boron hydrofluoric acid, 6–7 weight parts p-toluene sulfonic acid and 32–35 weight parts of water.

For making the resin component a resolic resin, i.e., a precondensate of phenol and formaldehyde having an average molecular weight of 500, and a precondensate of furfuryl alcohol and furfuryl aldehyde, jointly with additional furfuryl alcohol, are caused to react with a curing agent mixture. The curing process which is an exothermal reaction commences after an adjustable starting-up period. The amount of heat involved is sufficient to evaporate a bloating agent, e.g., a fluorinated hydrocarbon, sufficiently to create the desired foam texture. The bloating agent may be added to the resin component in the event of a constant formulation for a constant bulk density, or it is added as an additive during actual mixing of the resin precursors and the curing agents mixture.

The addition of suitable fillers causes the liberation of the volatile pyrolysis products in the event of fire even below the ignition temperature. For that purpose it was found necessary to have a ratio of resin material to inorganic fillers of 1:2.5 in order to attain the non-flammability according to DIN 4102. Higher filler contents up to a ratio of 1:3.20 are possible in principle, care having to be taken, however, that the viscosity does not increase too much and inhibits the foam formation. The pyrolysis products which are liberated on exposure to fire, may be rendered harmless in the context of subsequent fire hazards by a variety of combinations of the fillers.

Because of the low bulk density of a foam material as compared with a solids body, less combustible substance is made available per unit of volume. On the other hand, a larger region of the foam body, depthwise starting from the surface, is exposed to the fire due to the enlargement of the surface area because of the numerous cells of the plastic foam. However, this enlargement of the active internal surface area may be utilized in order to oxidize the pyrolysis products arising during fire exposure to such an extent that they either are no longer flammable or the formation of carbon monoxide is prevented substantially.

The main component of the inorganic filler mixture is an aluminum hydroxide mixed with cryolite wherein, if desired, a further portion of aluminum hydroxide is replaced by bentonite, montmorrillonite, zeolite, magnesium-or zinc aluminate having the formula Mg$^{II}$Al$_2$O$_4$, natural spinels, ground blast furnace slag or natural perlites. The filler mixture preferably has a definite particle size distribution. This is desirable, because since the size of the active surface area of this filler is variable, it may happen that it is inadequately wetted by the resin such that the coherence in the fully cured condition is inadequate. Finally, the viscosity of the mixture of resin ingredients and filler may become too high for processing.

The best suited aluminum hydroxide has screen analysis characteristics complying with total screen passing values

| 25% | 5.5 μm |
| 50% | 52.0 μm |
| 75% | 80.0 μm |

Other particle size distributions may also be used provided the particles have a suitable particle shape, for example, preferably spherical.

The effect of the aluminum hydroxide in combination with cryolite as a flame protectant resides not only in a dilution of the system, but also in a purely physical effect. In an endothermal process exposure to fire results in the liberation of water which in turn causes dilution of the combustible pyrolysis products and simultaneous cooling with reduction of the heat transfer into the deeper foam regions. In addition, the liberation of water resulting in physical effects also results in a thermodynamic effect.

The filler system of Example 2 comprising Al(OH)$_3$, boric acid, sodium tetraborate and cryolite withdraws from the added amount of heat in the event of burning, 63 K-joule evaporation enthalpy and melting enthalpy per 100 grams of resin compound, wherein the amount of melting enthalpy of cryolite and boric acid anhydride is about 22.1%. It is important that these amounts of melting enthalpy are withdrawn at essentially higher temperature ranges with reference to the evaporation enthalpies. Furthermore, a sintering effect appears at the interfaces between the particulate oxyolite, particulate sodium tetraborate and the particulate boric acid anhydride caused by melting point depression. However, a skelton of the original foam structure is maintained.

The aluminum hydroxide can be partially replaced by acid activated natural bentonites (fullers earth), montmorillonites, zeolites, etc. These filler compounds can also be prepared by mixed gel precipation, drying and subsequent grinding. The ground material should have a screen analysis sieve curve according to the following screen passing data:

| 25% | 5.5 μm |
| 50% | 52.0 μm |
| 75% | 80.0 μm |

Before their use, these compounds can be additionally loaded with steam. The amount of steam loading is up to about 20 percent by weight of the used filler compound. A higher loading might result in a plasticizing effect, for example, of the bentonite.

The deposition of water between the planes of crystal lattice furthermore results in an additional water vapor barrier under influence of high heat to the rigid foam. Furthermore, the rheological properties of the A-compound are improved and appearance of dilatory effects is avoided.

When a part of the aluminum hydroxide has been replaced in accordance with the foregoing, the filler material has the following composition:
30–45 weight parts aluminum hydroxide
5–15 weight parts bentonite, montmorillonite or zeolite
10–20 weight parts boric acid
2–4 weight parts sodium tetraborate
7–25 weight parts cryolite
1–3 weight parts copper II oxide The aluminum hydroxide can also be partially replaced by aluminates having the generic formula $Me^{II}Al_2O_4$ wherein Me is magnesium or zinc. Furthermore, natural spinels can be used, as can blast furnace slag, ground especially in the form of calcium aluminum silicate, natural perlites (ground), liponite, respectively quartz-porphyr-glass non-expanded, whereby the water included in the micropores is still maintained. These microporous water inclusions will be activated to a water vapor barrier at a higher temperature level than when using aluminum hydroxide.

The screen size curve of these ground products should be similar to that of bentonite as specified above. For example, the filler system may be as follows:
20–40 weight parts aluminum hydroxide
10–30 weight parts aluminates, blast furnace slag, perlites
10–20 weight parts boric acid
2–5 weight parts sodium tetraborate
7–25 weight parts cryolite
1–3 weight parts copper II oxide The sodium tetraborate may be replaced by zinc borate, $3ZnO.2B_2O$; magnesium hydroxide, $Mg(OH)_2$; or zinc hydroxide $Zn(OH)_2$, wherein the ratio of one of these materials:boric acid is 1:5. Replacement of sodium tetraborate by the above mentioned filler compounds results in a puffer effect similar to the effect caused by the tetraborate. Using zinc borate the amount of zinc/boron increases the catalytic effect during the carbonization process and the low temperature carbonization. In this instance, for example, the filler system is as follows:
40–50 weight parts aluminum hydroxide
10–20 weight parts boric acid
2–4 weight parts zinc borate, magnesium hydroxide or zinc hydroxide
7–25 weight parts cryolite
1–3 weight parts copper II oxide The use of boron compounds as filler substances offers the advantage that on exposure to fire initially a step-wise release of water as part of an endothermal reaction takes place with the formation of boric acid anhydrides. The resin pore skeleton is protected by a glass-like coating because boric acid anhydride softens at approximately 350° C. and becomes fluid from 500° C. onwards. Eventually, due to acid catalyzed water removal from the organic substance a dehydration takes place which results in an increased carbonization of the resin content.

The addition of copper oxide and manganese oxide as oxydizing agents to the filler has the effect that functional groups of the resin during the entire progress of the hardening process are converted oxidatively, cyclization and condensation resulting in products rich in carbon. These, when exposed to fire, promote carbonization and then protect the resin phase beneath the actual flame zone. In addition, carbon monoxide already formed in the closed cell foam structure beneath the carbonization zone is oxidized into carbon dioxide (reduction of the toxicity).

Further inorganic additives such as magnesium hydrosilicates or hydrous aluminum silicates, e.g., bentonite, serve the purpose to either react with the inorganic curing agent components or to bind water which is added or which is formed during the condensation.

The curing agent mixture is composed predominantly of inorganic acids with a small content of p-toluene sulfonic acid or p-phenol sulfonic acid. The exclusive use of organic sulfonic acids is disadvantageous since in the case of exposure to fire or the effect of pyrolysis temperatures (300–500° C.) any sulfur dioxide formed thereby will result in an increased formation of carbon monoxide in the pyrolysis gas equilibrium.

Having regard to a favorably timed incipient reaction (commencement time, rising period of the foam) and minimum amounts of added curing agent, the following acid combinations were found to be particularly suitable as curing agents:

| 100% phosphoric acid Weight % | 100% boron hydrofluoric acid Weight % | 100% paratoluene sulfonic acid or para-phenol sulfonic acid Weight % | Water Weight % |
| --- | --- | --- | --- |
| 41.5 | 17 | 6.9 | 34.6 |
| 45.9 | 14.3 | 6.6 | 33.2 |
| 49.0 | 12.2 | 6.6 | 32.2 |

The use of phosphoric acid in the curing catalyst, besides having a hydrogen ion donor function has the effect that on exposure to fire, the phosphoric acid acts in a manner similar to boric acid with regard to the reactions proceeding in the resin phase. Polymeric phosphoric acid is formed which, due to the formation of a glassy coating over the carbonaceous pore structure already formed, inhibits pyrolysis. This shielding against the attack of oxygen and heat radiation is resistant to high temperatures. The formation of phosphides which have a strongly reducing effect inhibits the formation of CO and $CO_2$ in favor of carbon formation. The so-called post-glimmering, caused by the oxidation of the carbon into CO and $CO_2$ is restricted.

The use of boron hydrofluoric acid also effects an improvement of the non-flammability of the foam material. The fluoroborates formed with the filler substances become effective in the case of fire by their liberation of boron trifluoride in the gas phase.

The rigid foam system is a dual component system of a resin component and a filler (component A) and a curing agent (component B), and the bloating agent can be admixed either to component A or may be introduced as a component C immediately prior to processing. Lower chlorofluoro hydrocarbons, e.g., trifluoromonochloromethane or trichlorotrifluoroethane and also n-pentane, all having a boiling point in the range of about 24° C. to 48° C. are suitable as bloating agents. When replacing one bloating agent (trichlorotrifluoroethane) by another of the above-mentioned substances, the amount introduced must be divided by a factor:

| Replacement of trichlorofluoroethane by n—pentane | (F = 1) F = 2.6 |

| | |
|---|---|
| by trifluoromonomethane | F = 1.8 |

Thus a predetermined bulk density may be maintained whenever one bloating agent is replaced by another. According to experience, the flammable n-pentane has no effect on the non-flammability of the foam material.

A further possibility of attaining a bloating effect resides in the injection of compressed air into the premixing chamber of the intensive mixer when processing the components. This so-called "nuclearization air" due to its forming nuclei promotes the bloating process in the presence of bloating agents; however, it may even produce a foam structure without bloating agents.

The rigid foam thus represents a complex reaction mixture within which, even after the mixing of components A and B, additional fire inhibiting substances are formed. Moreover, in the event of fire exposure further reactions take place step by step as the temperature rises which similarly counteract an ignition of the foam material.

The rigid foam in view of its mechanical strength represents a non-flammable building material which can be used as premanufactured components or for foam application in situ. The composition according to the invention permits the attainment of bulk densities between 50 kg/m$^3$ and 450 kg/m$^3$. In the event of bulk densities up to 150 kg/m$^3$ a non-flammable hard foam having very good thermal insulating properties is formed. Bulk densities between 200 and 450 kg/m$^3$ result in load-bearing building components. Accordingly the bulk density of the foam according to the invention is preferably adjusted within the range of 70 kg/m$^3$ to 300 kg/m$^3$. If a particularly high fire resistant class is desired combined with increased mechanical strength, bulk densities between 150 kg/m$^3$ and 250 kg/m$^3$ were found to be particularly suitable.

The rigid foam in the case of usual design configurations complies with the requirements of class A 2 in the fire resistance test in a fire shaft according to DIN 4102. As required by this DIN specification, no toxic gases are formed in the case of fire. The curing agent composition results in a residual acid content so low that no corrosion effects whatsoever arise from bonding the foam to metallic screening panels. Similarly, with rigid foam systems according to the invention the hygroscopy experienced with similar systems is greatly reduced.

The employment of precondensed furane resin in the resin component permits an improved regulation of the reactivity and extends the rising period of the foam. In addition the strength of the cellular structure is improved. If, instead of conventional foam stabilizers, pyrogenic silicic acid is used as a thixotropic additive, the pore structure may be regulated particularly well.

The advantage of the addition of copper oxide as oxidizing agent resides, as stated above, in that during the curing phase, reactions with the functional terminal groups of the resin components take place. In the event of fire this results in a decrease of the formation of carbon monoxide in the closed cell pore structure and thus in a reduction of the toxicity of the combustion gases. The addition of magnesium hydroxy silicate and aluminum silicates makes possible reactions with the anions of the curing system, causing these to be bound.

Phosphoric acid and boronhydrofluoric acid in the curing agent system serve as hydrogen ion donors for condensing the resin system. The phosphates formed at the same time act as further flame protectors. The system is manufactured ready for use as a two component system. Component A comprises the resin component and the filler, and component B comprises the curing agent. As previously stated, the bloating agent may be admixed with component A or be introduced as a further component C during mixing of components A and B. The preferred composition of the resin component comprises a mixture of:

56.6 weight % resolic resin
29.9 weight % furfuryl alcohol
12.6 weight % furane resin
0.9 weight % foam stabilizer If in the case of certain mixtures of filler substances retardation of the start of the reaction after the addition of the curing agent is experienced and an increased reactivity of the resin component is desired, the following composition is found to be particularly suitable:

60.3 weight % resolic resin
38.8 weight % furfuryl alcohol
0.9 weight % foam stabilizer The range of use of the rigid foam is very wide, it being suitable particularly as a non-flammable building material. Premanufactured components may be manufactured therefrom such as panels, half shells and pipe jacketings. It is also possible to manufacture foam panels continuously laminated with foils or sheet metal on so-called dual band machines. The two component system may, however, also be used for injecting foam into cavities in situ as is desired for example in the context of service ducts or air conditioning ducts.

Premanufactured panels were subjected to preliminary testing according to DIN 4102 and DIN 5346. DIN 4102 was directed to the fire hazard testing in a fire shaft or to kiln testing. DIN 53436 relates to smoke and pyrolysis gas evolution in fire situations. The following results were attained in the above:

maximum temperature increase in the kiln at 750° C., average of three measurements: 32° C. (maximum permitted value: +50° C.).

In the fire shaft:
the flame level amounted to 50 cm (maximum limit 65m)
residual length: 40 cm (limiting value 35 cm)
flue gas temperature: 105° C. (limit 125° C.)
flue gas density: very low, no after burning, no after glimmering
flue gas density: XP2 chamber 2% (limiting value 15%)
pyrolysis gases according to DIN 53436: 0.01% by volume (upper limit 0.04% by volume).

The present invention will be understood from the following non-limiting examples.

EXAMPLE 1

| A-component: (resin and filler) | phenol resol | 14.7 weight % |
|---|---|---|
| | furfuryl alcohol | 11.5 weight % |
| | stabilizer | 1.0 weight % |
| | boric acid | 12.5 weight % |
| | aluminum hydroxide | 48.5 weight % |
| | copper oxide | 1.0 weight % |
| | sodium tetraborate | 2.5 weight % |
| | cryolite | 8.3 weight % |
| | | 100.0 weight % |

Reaction Mixture:
100 weight parts A component
3-6 weight parts propellant
(trichlorotrifluoroethane)

| | | |
|---|---|---|
| 17 weight parts curing agent | 50.0 weight % phosphoric acid mixture | |
| | 15.0 weight % boronhydrofluoric acid | |
| | 5.5 weight % p-toluene sulfonic acid | |
| | 29.5 weight % water | |

After intensive mixing a rigid foam was attained having a bulk density depending on the used amount of propellant of between 100 and 350 kg/m³ and having clearly lower amount of toxic material within the gas becoming free by a low temperature carbonization process.

EXAMPLE 2

| | | | |
|---|---|---|---|
| A-component: | phenol resol | 15.7 | weight % |
| (Resin and | furfuryl alcohol | 12.5 | weight % |
| filler) | stabilizer | 1.0 | weight % |
| | aluminum hydroxide | 36.0 | weight % |
| | boric acid | 13.0 | weight % |
| | sodium tetraborate | 2.6 | weight % |
| | cryolite | 17.2 | weight % |
| | copper II oxide | 2.0 | weight % |
| | | 100.0 | weight % |
| Reaction Mixture | | | |
| 100 weight parts Component A | | | |
| 46 weight parts propellant (trifluorotrichloroethane) | | | |

17 weight parts curing agent mixture of Example 1. This batch resulted in a rigid foam having a bulk density of about 100 kg/m³, maintaining its structure during burning for the reason of sintering of the filler particles.

EXAMPLE 3

| | | | |
|---|---|---|---|
| A-component: | phenol resol | 14.7 | weight % |
| resin and | furfuryl alcohol | 11.5 | weight % |
| filler) | stabilizer | 1.0 | weight % |
| | aluminum hydroxide | 40.5 | weight % |
| | boric acid | 12.5 | weight % |
| | zinc borate | 2.5 | weight % |
| | cryolite | 8.3 | weight % |
| | copper II oxide | 1.0 | weight % |
| | | 100.0 | weight % |
| Reaction mixture: | | | |
| 100 weight % A component | | | |
| 4 weight % propellant (trichlorotrifluoroethane) | | | |
| 17 weight % curing agent mixture | | | |
| 50.0 weight % phosphoric acid | | | |
| 15.0 weight % boronhydrofluoric acid | | | |
| 5.5 weight % p-toluene sulfonic acid | | | |
| 29.5 weight % water | | | |

This example resulted in a rigid foam having an extended starting time and extended expanding time. Starting time is the time until the exothermic reaction begins.

EXAMPLE 4

| | | | |
|---|---|---|---|
| A-component: | phenol resol | 14.7 | weight % |
| | furfuryl alcohol | 11.5 | weight % |
| | stabilizer | 1.0 | weight % |
| | aluminum hydroxide | 40.0 | weight % |
| | bentonite | 8.5 | weight % |
| | boric acid | 12.5 | weight % |
| | sodium tetraborate | 2.5 | weight % |
| | cryolite | 8.3 | weight % |
| | copper oxide | 1.0 | weight % |
| | | 100.0 | weight % |

The reaction mixture was as in Example 3. This resulted in a rigid foam being resistant against high temperature during burning for the reason of having an increased water vapor barrier.

EXAMPLE 5

| | | | |
|---|---|---|---|
| A-component: | phenol resol | 14.7 | weight % |
| (resin and | furfuryl alcohol | 11.5 | weight % |
| filler) | stabilizer | 1.0 | weight % |
| | aluminum hydroxide | 38.5 | weight % |
| | perlite | 10.0 | weight % |
| | boric acid | 12.5 | weight % |
| | sodium tetraborate | 2.5 | weight % |
| | cryolite | 8.3 | weight % |
| | copper oxide | 21.0 | weight % |
| | | 100.0 | weight % |

This reaction mixture provided under similar conditions as described before, a rigid foam having a bulk density of about 100 kg/m³ but having higher pressure resistance (compressive strength) as a rigid foam without a filler mixture having the further additive identified above.

COMPARATIVE EXAMPLE (According to Example 4 of DE-PS 28 25 295 with 500 kg/m³ bulk density)

| Composition of the system | | |
|---|---|---|
| phenolic resin | 12.8 | weight % |
| furfurylalcohol | 12.8 | weight % |
| Ethanol | 1.3 | weight % |
| Butanol | 1.3 | weight % |
| butyglycol | 1.9 | weight % |
| paraformaldehyde | 1.9 | weight % |
| epoxy resin | 0.4 | weight % |
| polyester resin | 0.3 | weight % |
| aluminum hydroxide | 64.3 | weight % |
| fibers | 0.4 | weight % |
| $SiO_2$ | 2.6 | weight % |
| | 100.0 | weight % |

The ratio of organic substances/inorganic substances amounted to 1:2.06, a figure which by experience yields substantially higher heating values than those permitted according to DIN 4102 for non-flammability. If the same ratio is determined in the fully cured state, this value even changes to 1:1.60.

Samples practiced according to that recipe produced viscosity values which in view of the extremely high viscosity of the so-called A component produced foams of bulk density close to 500 kg/m³ with difficulty. Moreover, when exposed to pyrolysis temperature, very much sulfur dioxide was evolved—so much that in the condensate (water) in the cooling pipe of the pyrolysis apparatus (DIN 53 436) an excessive acid reaction was to be observed. This high sulfur dioxide content in the pyrolysis gas was also the cause for the measured CO concentrations in the inhalation chamber (rat test). This, in the example here given, amounted to 0.13 volume %. The permitted maximum is 0.04 volume %. This pyrolysis gas is accordingly to be considered quite toxic.

The comparative example demonstrates the drawbacks of the prior art material particularly clearly.

All rigid foams produced according to the aforesaid examples prior to loading required a curing period of about 7 days. The complete hardening throughout of the cellular structure by cross linking is assured only then. The batches described in the examples can be processed with conventional component dosage and mixing machines since the viscosity of the liquid system according to the composition of the invention as compared with known systems having higher filler contents is lower.

What is claimed is:

1. A non-flammable rigid foam on the basis of phenolic resin and furane resin, containing aluminum hydroxide and further components as a filler system, the weight ratio of resin substance : filler substance is at least 1:2.5 and up to 1:3.2 and the bulk density is from 50 kg/m$^3$ to 450 kg/m$^3$ and the resin compound is the reaction product obtained by the reaction with one another of
   - 50–62 weight parts resolic resin
   - 0–15 weight parts furanic resin
   - 25–40 weight parts furfuryl alcohol
   - 0.5–1.5 weight parts foam stabilizer including 14–17 parts by weight per 100 parts by weight of resin component + filler substance of a curing agent mixture composed of
   - 40–50 weight parts phosphoric acid
   - 12–17 weight parts boron hydrofluoric acid
   - 6–7 weight parts p-toluene sulfonic acid or p-phenol sulfonic acid and
   - 32–35 weight parts water, wherein the filler system is composed of:
   - 40–50 weight parts aluminum hydroxide;
   - 10–20 weight parts boric acid;
   - 7–25 weight parts cryolite;
   - 1–3 weight parts copper-II oxide; and
   - 2–5 weight parts sodium tetraborate the ratio of borate: boric acid being 1:5 in said filler system.

2. The non-flammable rigid foam according to claim 1 wherein said sodium tetraborate in said filler system is replaced by zinc borate, magnesium hydroxide, zinc hydroxide or a mixture thereof.

3. The non-flammable rigid foam according to claim 1 containing 2–5 weight parts of said filler compound.

4. The non-flammable rigid foam according to claim 1 wherein a portion of the aluminum hydroxide is replaced by acid activated bentonite, montmorrilonite or zeolite whereby the filler system contains 30 - 45 weight parts aluminum hydroxide combined with 5 - 15 weight parts bentonite, montmorillonite or zeolite.

5. The non-flammable rigid foam according to claim 4 wherein said aluminum hydroxide, acid activated bentonite, montmorillonite and zeolite have a screen analysis curve according to the following screen passing data:

| | |
|---|---|
| 25% | 5.5 μm |
| 50% | 52.0 μm |
| 75% | 80.0 μm |

6. The non-flammable rigid foam according to claim 1 wherein a portion of the aluminum hydroxide is replaced by magnesium aluminate, zinc aluminate, natural spinels, ground blast furnace slag or natural perlites whereby the filler system contains 20 - 40 weight parts aluminum hydroxide combined with 10 - 30 weight parts magnesium aluminate, zinc aluminate, natural spinels, ground blast furnace slag or natural perlites.

7. The non-flammable rigid foam according to claim 6 wherein said aluminum hydroxide, magnesium aluminate, zinc aluminate, natural spinels, ground blast furnace slag and natural perlites have a screen analysis curve according to the following screen passing data:

| | |
|---|---|
| 25% | 5.5 μm |
| 50% | 52.0 μm |
| 75% | 80.0 μm |

8. The non-flammable rigid foam according to claim 7 wherein the foam stabilizer is pyrogenic silicic acid.

9. The non-flammable rigid foam according to claim 6 wherein the foam stabilizer is pyrogenic silicic acid.

10. The non-flammable rigid foam according to claim 5 wherein the foam stabilizer is pyrogenic silicic acid.

11. The non-flammable rigid foam according to claim 4 wherein the foam stabilizer is pyrogenic silicic acid.

12. The non-flammable rigid foam according to claim 3 wherein the foam stabilizer is pyrogenic silicic acid.

13. The non-flammable rigid foam according to claim 2 wherein the foam stabilizer is pyrogenic silicic acid.

14. The non-flammable rigid foam according to claim 1 wherein the foam stabilizer is pyrogenic silicic acid.

15. The method which comprises utilizing the rigid foam of claim 1 as a non-flammable building material.

16. The method which comprises utilizing the rigid foam of claim 1 as pre-manufactured board, panel, half shell or pipe cladding.

17. The method which comprises injecting the rigid foam of claim 1 in situ into cavities in buildings.

* * * * *